(12) United States Patent
Hsieh et al.

(10) Patent No.: US 8,094,698 B2
(45) Date of Patent: Jan. 10, 2012

(54) METHOD FOR GENERATING A SPREAD SPECTRUM CLOCK AND APPARATUS THEREOF

(75) Inventors: Meng-Han Hsieh, Hsinchu (TW); Chi-Shun Weng, Hsinchu County (TW); Ming-Je Li, Yilan County (TW); Kai-Yi Fang, Kaohsiung County (TW)

(73) Assignee: Realtek Semiconductor Corp., Science Park, HsinChu (TW)

( * ) Notice: Subject to any disclaimer, the term of this patent is extended or adjusted under 35 U.S.C. 154(b) by 547 days.

(21) Appl. No.: 12/358,261

(22) Filed: Jan. 23, 2009

(65) Prior Publication Data
US 2009/0190631 A1    Jul. 30, 2009

Related U.S. Application Data

(60) Provisional application No. 61/024,200, filed on Jan. 29, 2008.

(30) Foreign Application Priority Data

Jan. 22, 2009  (TW) .............................. 98102495 A

(51) Int. Cl.
H04B 1/69  (2006.01)
(52) U.S. Cl. ...................................................... 375/130
(58) Field of Classification Search .................. 375/130, 375/139; 708/250
See application file for complete search history.

(56) References Cited

U.S. PATENT DOCUMENTS

| | | | |
|---|---|---|---|
| 5,118,975 A | 6/1992 | Hillis et al. | |
| 6,993,109 B2 | 1/2006 | Lee et al. | |
| 7,233,210 B2 | 6/2007 | Kaizuka | |
| 7,346,095 B1 * | 3/2008 | Hattori | 375/130 |
| 8,009,719 B2 * | 8/2011 | Shao et al. | 375/130 |
| 2007/0019711 A1 * | 1/2007 | Mallinson et al. | 375/130 |

* cited by examiner

Primary Examiner — Young T. Tse
(74) Attorney, Agent, or Firm — Winston Hsu; Scott Margo

(57) ABSTRACT

A method for generating a spread spectrum clock includes the steps of providing a reference clock having a reference period; generating a plurality of output clocks respectively having different phases according to the reference clock; generating a first/second control signal according to the reference clock and a spread spectrum clock and starting a first/second duration accordingly; during the first/second duration, outputting a first/second selecting signal representing a first/second predetermined sequence according to the first/second control signal, wherein the second predetermined sequence is a substantial reversed sequence of the first predetermined sequence; and during the first/second duration, sequentially outputting some or all of the output clocks as the spread spectrum clock according to the first/second predetermined sequence.

18 Claims, 9 Drawing Sheets

METHOD FOR GENERATING A SPREAD SPECTRUM CLOCK AND APPARATUS THEREOF

CROSS REFERENCE TO RELATED APPLICATIONS

This application claims the benefit of U.S. Provisional Application No. 61/024,200, which was filed on Jan. 29, 2008 and is incorporated herein by reference. In addition, this application claims priority of Taiwanese Application No. 098102495, which was filed on Jan. 22, 2009 and is incorporated herein by reference.

BACKGROUND OF THE INVENTION

1. Field of the Invention

The present invention relates to a method for generating a spread spectrum clock and a related apparatus, and more particularly, to a method for determining the timing point for switching frequency of the generated spread spectrum clock and a related apparatus.

2. Description of the Prior Art

The clock circuit is one of the most important components among the electronic devices, and it affects the performance of the whole system deeply. However, the clock signals at their frequencies always have a very strong electromagnetic interference (EMI). Usually, a threshold value is defined, and we hope that the EMI of the clock signals all fall under this threshold value.

Hence, by dynamically adjusting the frequency of the clock signals to disperse the energy of the clock signals to different frequencies, such technology is known as the Spread Spectrum Clock Generation.

SUMMARY OF THE INVENTION

It is therefore one of the objectives of the claimed invention to provide a method for generating a spread spectrum clock and a related apparatus for solving the abovementioned problems.

According to an exemplary embodiment of the present invention, a method for providing a spread spectrum clock is provided. The method includes the steps of providing a reference clock having a reference period; generating a plurality of output clocks respectively having different phases according to the reference clock; generating a first control signal according to the reference clock and the spread spectrum clock and starting a first duration; during the first duration, outputting a first selecting signal representing a first predetermined sequence according to the first control signal; during the first duration, outputting some or all of the output clocks as the spread spectrum clock according to the first predetermined sequence of the first selecting signal; generating a second control signal according to the reference clock and the spread spectrum clock and starting a second duration; during the second duration, outputting a second selecting signal representing a second predetermined sequence according to the second control signal, wherein the second predetermined sequence is a substantial reversed sequence of the first predetermined sequence; and during the second duration, outputting some or all of the output clocks as the spread spectrum clock according to the second predetermined sequence of the second selecting signal.

According to an exemplary embodiment of the present invention, a spread spectrum clock generating apparatus for generating a spread spectrum clock according to a reference clock is provided. The spread spectrum clock generating apparatus includes a spread spectrum clock generating circuit and a reference clock generating circuit. The spread spectrum clock generating circuit includes a control signal generator, a selecting signal generator, a multi-phase clock generator, and a selector. The control signal generator respectively generates a first control signal and a second control signal according to the reference clock and the spread spectrum clock, and starts a first duration and a second duration accordingly. The selecting signal generator outputs a first selecting signal representing a first predetermined sequence according to the first control signal during the first duration, and outputs a second selecting signal representing a second predetermined sequence according to the second control signal during the second duration, wherein the second predetermined sequence is a substantial reversed sequence of the first predetermined sequence. The multi-phase clock generator generates a plurality of output clocks respectively having different phases according to the reference clock. The selector outputs some or all of the output clocks as the spread spectrum clock according to the first predetermined sequence of the first selecting signal during the first duration, and outputs some or all of the output clocks as the spread spectrum clock according to the second predetermined sequence of the second selecting signal during the second duration.

These and other objectives of the present invention will no doubt become obvious to those of ordinary skill in the art after reading the following detailed description of the preferred embodiment that is illustrated in the various figures and drawings.

DETAILED DESCRIPTION

The instant application contains a claim under §1.55 for priority of a prior-filed foreign application (Taiwanese Application No. 098102495, filed on Jan. 22, 2009) and a claim under §1.78 for the benefit of a prior-filed provisional application (U.S. Provisional Application No. 61/024,200, filed on Jan. 29, 2008). In accordance with 37 C.F.R 1.57, if all or a portion of the specification or drawing(s) is inadvertently omitted from the instant application, the inadvertently omitted portion of the specification or drawing(s) is completely contained in the prior-filed applications as the claim under §1.55 and the claim under §1.78 shall also be considered an incorporation by reference of the prior-filed applications as to the inadvertently omitted portion of the specification or drawing(s).

Figure 1:
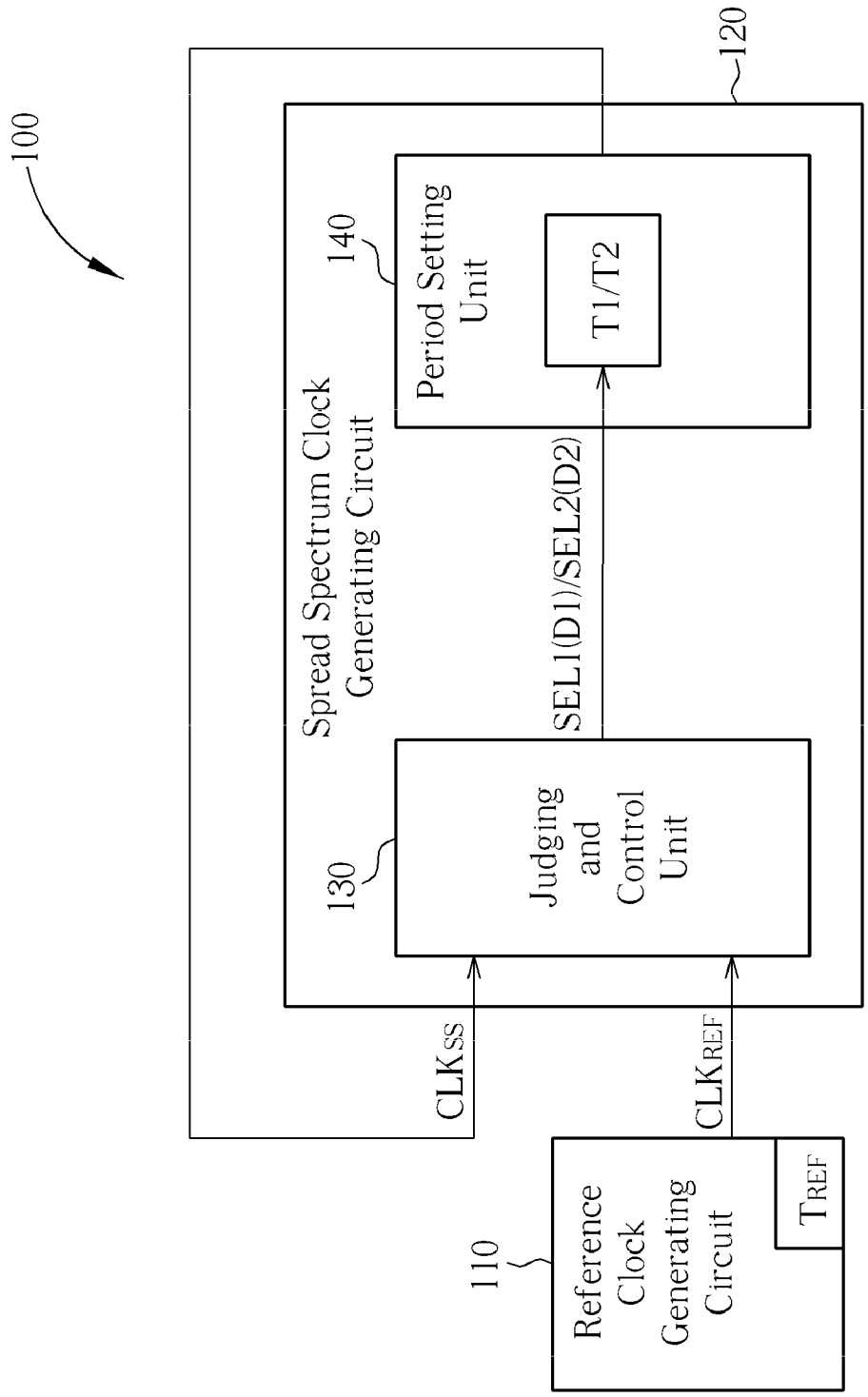
FIG. 1 is a diagram of a spread spectrum clock generating apparatus according to a first embodiment of the present invention.

FIG. 1 is a diagram of a spread spectrum clock generating apparatus 100 according to a first embodiment of the present invention. As shown in FIG. 1, the spread spectrum clock generating apparatus 100 includes a reference clock generating circuit 110 and a spread spectrum clock generating circuit 120. The reference clock generating circuit 110 provides a reference clock $CLK_{REF}$ having a reference period $T_{REF}$, and the spread spectrum clock generating circuit 120 generates a spread spectrum clock $CLK_{SS}$ according to the reference clock $CLK_{REF}$. The spread spectrum clock generating circuit 120 includes a judging and control unit 130 and a period setting unit 140. The judging and control unit 130 generates a first selecting signal SEL1 or a second selecting signal SEL2 according to the difference between the reference clock $CLK_{REF}$ and the spread spectrum clock $CLK_{SS}$, so as to indicate the period setting unit 140 to switch from a duration D1 to a duration D2 or from the duration D2 to the duration D1. In this embodiment, the judging and control unit 130 switches the durations D1 and D2 when the difference between the reference clock $CLK_{REF}$ and the spread spectrum clock $CLK_{SS}$ is equal to $T_{REF}/2$ to achieve a better effect on spreading spectrum. The period setting unit 140 respectively provides the spread spectrum clock $CLK_{SS}$ having a first average period T1 and a second average period T2 during the duration D1 and the duration D2. Please note that, although the duty cycle of the reference clock $CLK_{REF}$ equals 50% in this embodiment, but this should not be considered a limitation of the present invention.

Figure 2:
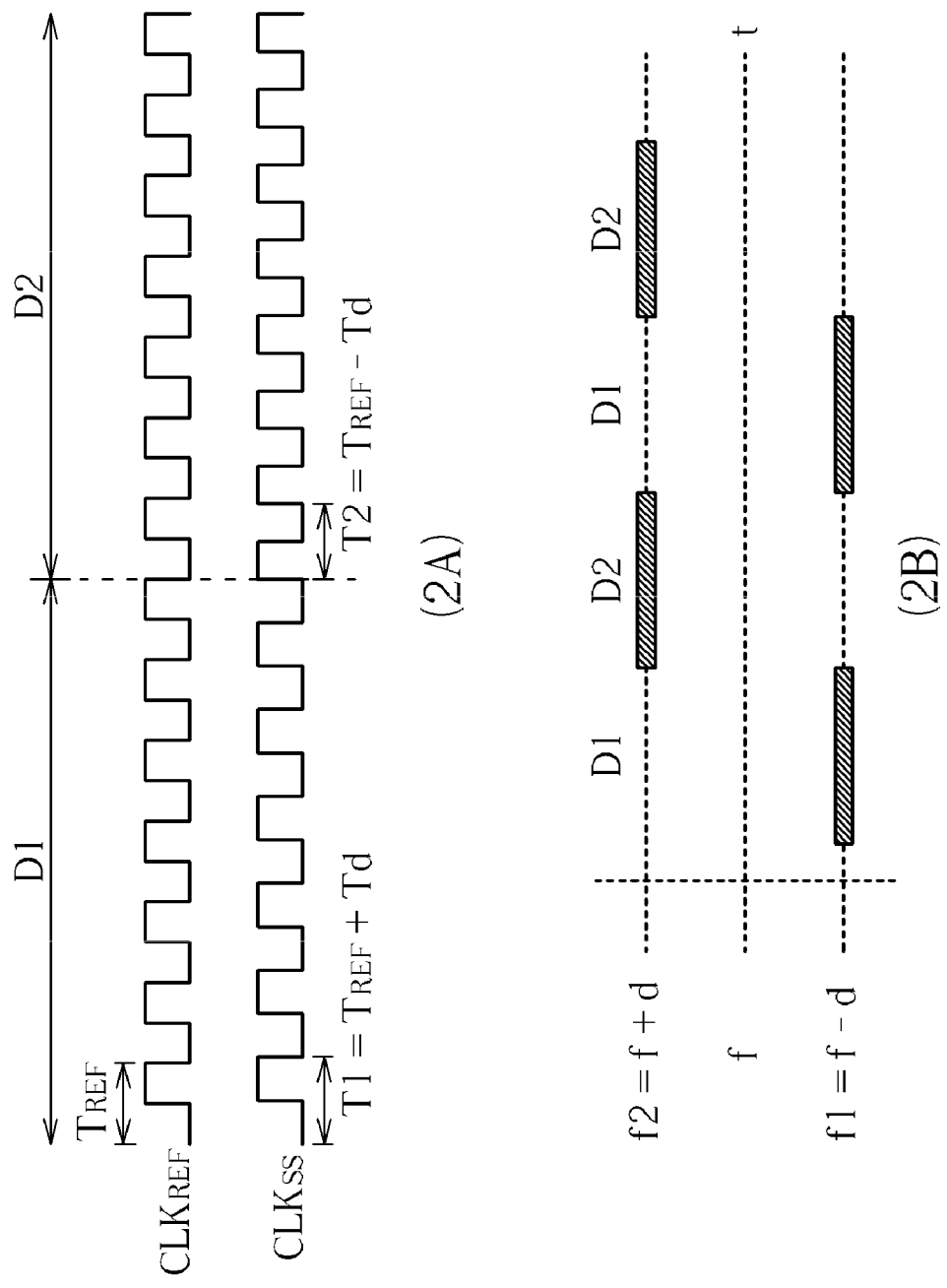
FIG. 2 (including 2A and 2B) is a diagram showing the spread spectrum clock in FIG. 1.

FIG. 2 (including 2A and 2B) is a diagram showing the spread spectrum clock $CLK_{SS}$ in FIG. 1, wherein 2A is viewed from a perspective of period and 2B is viewed from a perspective of frequency. As shown in 2A, $T1=T_{REF}+T_d$ and $T2=T_{REF}-T_d$, wherein $T_d$ represents a delay time. Therefore, the spread spectrum clock $CLK_{SS}$ has the average period T1 greater than the reference period $T_{REF}$ during the duration D1 (as is shown at the left side of the dotted line), and has the average period T2 smaller than the reference period $T_{REF}$ during the duration D2 (as is shown at the right side of the dotted line). Please note that, when implementing the present invention according to the disclosure of the specification, those skilled in the art can design a variety of average periods T1 and T2 and corresponding circuits to implement the present invention as long as the total delay time (or phase) accumulated during the duration D1 is substantially equal to the total preceding time (or phase) accumulated during the duration D2.

As shown in 2B, assume that the frequency of the spread spectrum clock $CLK_{SS}$ is represented by f. During the duration D1, the frequency of the spread spectrum clock CLK, falls in the frequency f1 (i.e., f−d, wherein "d" is a difference value) corresponding to the average period T1; during the duration D2, the frequency of the spread spectrum clock $CLK_{SS}$ falls in the frequency f2 (i.e., f+d) corresponding to the average period T2. Hence, because the frequency of the spread spectrum clock $CLK_{SS}$ is not centered on a single frequency, a goal of dispersing energy and reducing electromagnetic interference can be achieved. In addition, to avoid a phenomenon that the frequency of the spread spectrum clock $CLK_{SS}$ compared to the frequency of the reference clock $CLK_{REF}$ is too faster or too slower for a long time to lead to the data throughput inconsistent before and after spreading spectrum, the duration D1 is designed to be equal to the duration D2 in this embodiment. But this is not a limitation of the present invention, this phenomenon can be avoided only if the total delay time (or phase) accumulated during the duration D1 equals the total preceding time (or phase) accumulated during the duration D2.

Figure 3:
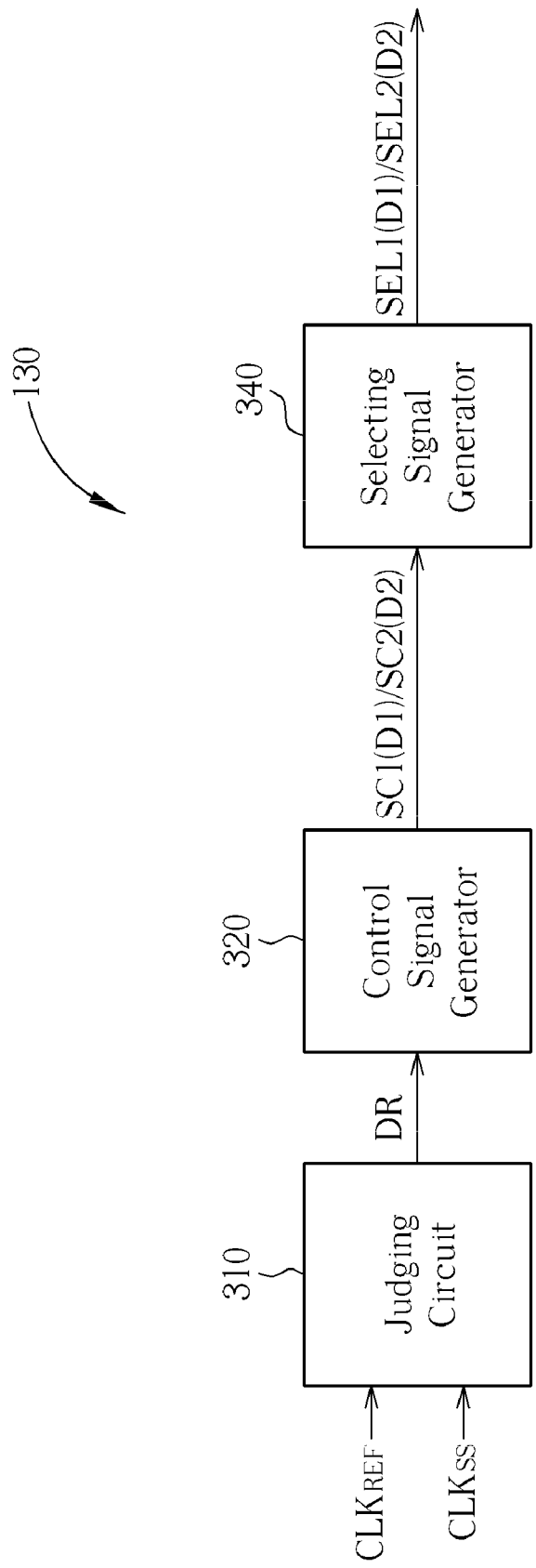
FIG. 3 is a diagram showing an embodiment of the judging and control unit shown in FIG. 1.

FIG. 3 is a diagram showing an embodiment of the judging and control unit 130 shown in FIG. 1. As shown in FIG. 3, the judging and control unit 130 includes a judging circuit 310, a control signal generator 320 (such as a finite state machine), and a selecting signal generator 340. The judging circuit 310 receives the reference clock $CLK_{REF}$ and the spread spectrum clock $CLK_{SS}$, and determines whether an edge ED of the reference clock $CLK_{REF}$ meets with a first edge ED1 or a second edge ED2 of the spread spectrum clock $CLK_{SS}$ to generate a judging result DR. The control signal generator 320 is coupled to the judging circuit 310. The control signal generator 320 generates the first control signal SC1/the second control signal SC2 when the judging result DR indicates that the edge ED of the reference clock $CLK_{REF}$ meets with the first edge ED1/the second edge ED2 of the spread spectrum $CLK_{SS}$, and then starts the aforementioned duration D1/D2. The first control signal SC1 and the second control signal SC2 can be the same trigger signal or different signals having different levels (or logic values). During the duration D1, the selecting signal generator 340 outputs the first selecting signal SEL1 representing the first predetermined sequence S1 according to the first control signal SC1; and during the duration D2, the selecting signal generator 340 outputs the selecting signal SEL2 representing the second predetermined sequence S2 according to the second control signal SC2, wherein the second predetermined sequence S2 is a substantial reversed sequence of the first predetermined sequence S1. For example, the control signal generator 320 can be implemented by a counter. If the counter counts up (for example, counting from 1 to n) during the duration D1, the generated count signal CNT is the first selecting signal SEL1. If the counter counts down (for example, counting from n to 1) during the duration D2, the generated count signal CNT is the second selecting signal SEL2. The first selecting signal SEL1 and the second selecting signal are further used for controlling the period setting unit 140 shown in FIG. 1.

Figure 4:
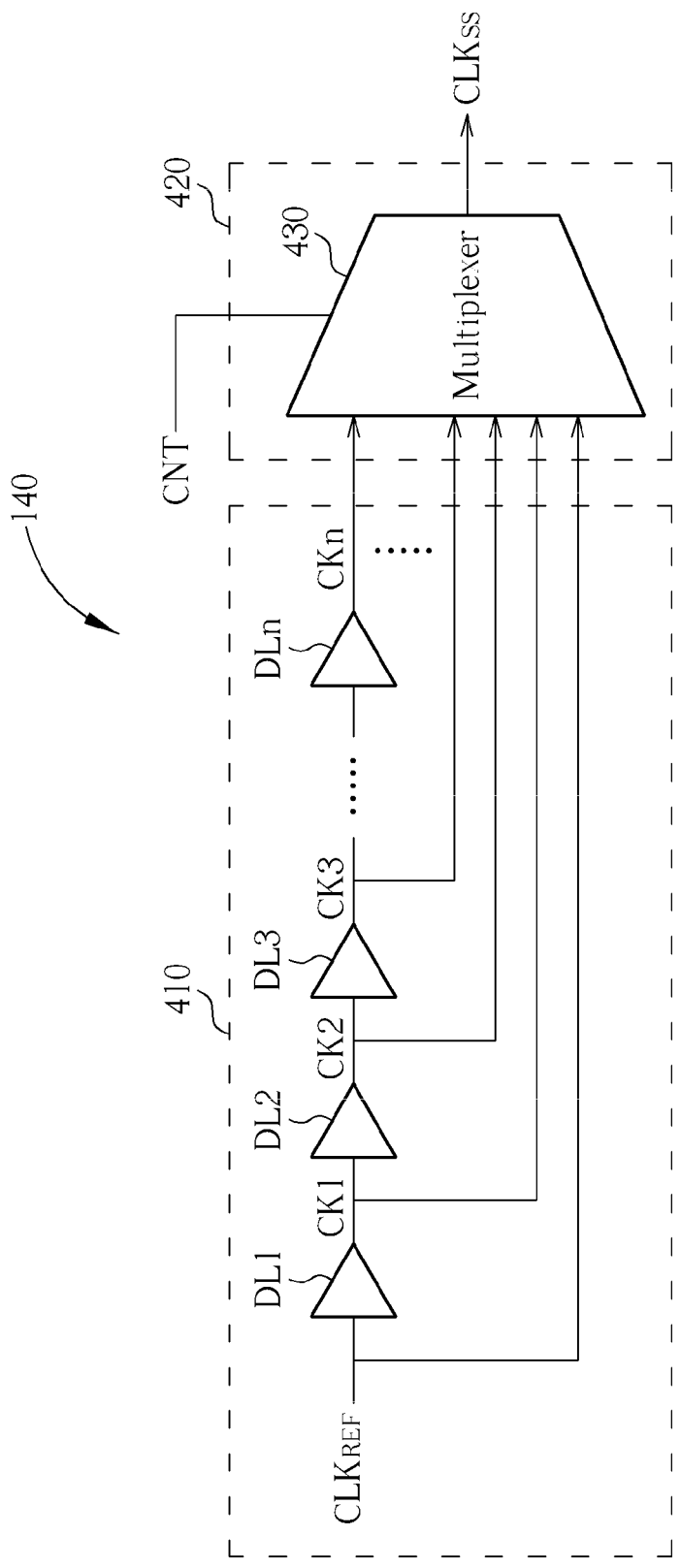
FIG. 4 is a diagram showing an embodiment of the period setting unit shown in FIG. 1.

FIG. 4 is a diagram showing an embodiment of the period setting unit 140 shown in FIG. 1. As shown in FIG. 4, the period setting unit 140 includes a multi-phase clock generator 410 and a selector 420. In this embodiment, the multi-phase clock generator 410 utilizes a plurality of delays DL1~DLn to put off the reference clock $CLK_{REF}$ to generate a plurality of output clocks CK1~CKn. In addition, the selector 420 is implemented by a multiplexer 430 in this embodiment, wherein the multiplexer 430 receives the output clocks CK1~CKn. During the duration D1, the multiplexer 430 sequentially outputs the output clocks CK1, CK2, . . . , and CKn as the spread spectrum clock $CLK_{SS}$ according to the first selecting signal SEL1 outputted by the selecting signal generator 340 shown in FIG. 3, wherein the corresponding waveform is like the spread spectrum clock $CLK_{SS}$ during the duration D1 shown in 2A. During the duration D2, the multiplexer 430 sequentially outputs the output clocks CKn, CKn−1, . . . , CK2, and CK1 as the spread spectrum clock $CLK_{SS}$ according to the second selecting signal SEL2 outputted by the selecting signal generator 340 shown in FIG. 3, wherein the corresponding waveform is like the spread spectrum clock $CLK_{SS}$ during the duration D2 shown in 2A.

Figure 5:
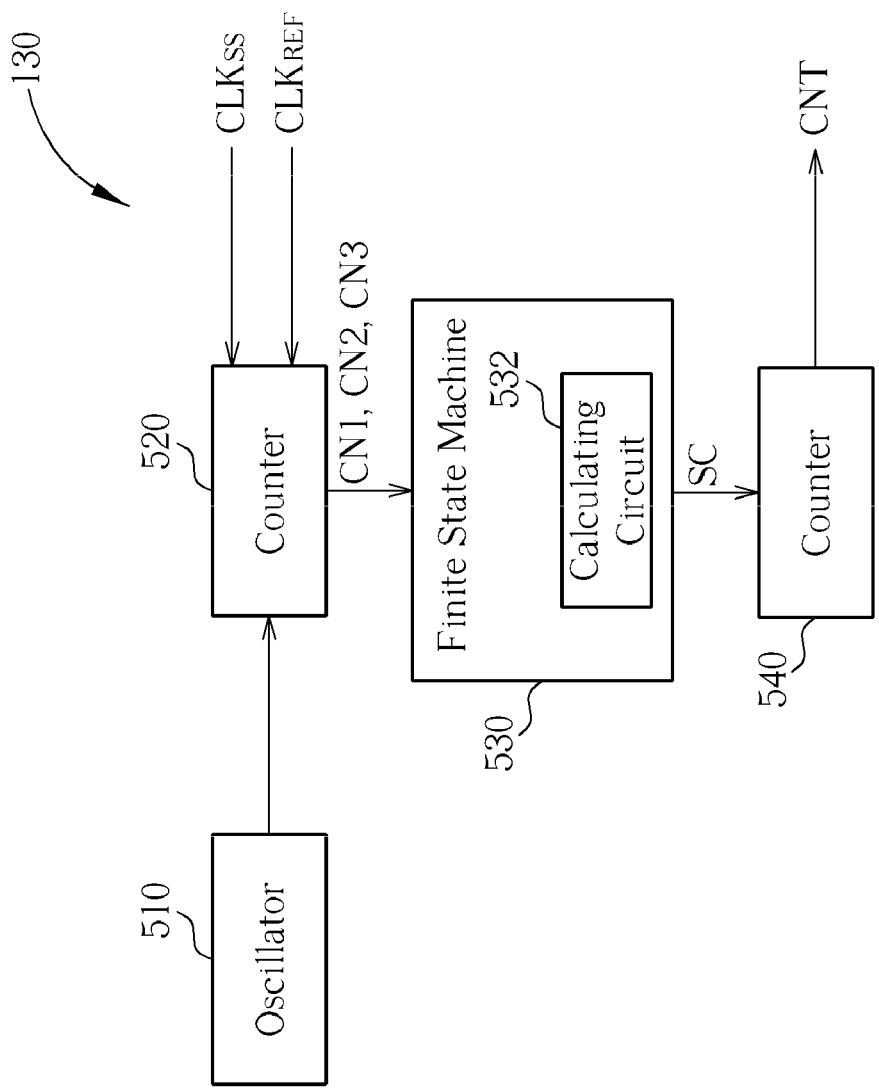
FIG. 5 is a diagram showing another embodiment of the judging and control unit shown in FIG. 1.

FIG. 5 is a diagram showing another embodiment of the judging and control unit 130 shown in FIG. 1. The major difference between FIG. 5 and FIG. 3 is that the judging and control unit 130 shown in FIG. 5 determines whether to switch the durations D1 and D2 according to the oscillation frequency of an oscillator 510 (such as a ring oscillator) but not the relationship between the positive edge and the negative edge. In this embodiment, the oscillation frequency of the oscillator 510 is greater than the frequency of the reference clock $CLK_{REF}$. The counter 520 generates an oscillator counting value CN1 according to the oscillation frequency of the oscillator 510, generates a reference clock counting value CN2 according to the reference clock $CLK_{REF}$, and generates a spread spectrum clock counting value CN3 according to the spread spectrum clock $CLK_{SS}$. The finite state machine 530 can include a calculating circuit 532. The calculating circuit 532 determines a counting value corresponding to the reference period $T_{REF}$ of the reference clock $CLK_{REF}$ based on the oscillator counting value CN1 and the reference clock counting value CN2. For example, if one reference clock counting value CN2 corresponds to four oscillator counting value CN1, it indicates that the oscillator counting value CN1 to which one reference period $T_{REF}$ corresponds is four. In addition, the calculating circuit 532 determines another counting value corresponding to the period $T_{SS}$ of the spread spectrum clock $CLK_{SS}$ based on the oscillator counting value CN1 and the spread spectrum clock counting value CN3. For example, if one spread spectrum clock counting value CN3 corresponds to 3.8 or 4.2 oscillator counting value CN1, it indicates that the oscillator counting value CN1 to which one period $T_{SS}$ corresponds is 3.8 or 4.2. Thus, the absolute value of the difference $T_d$ between the periods $T_{REF}$ and $T_{ss}$ equals 0.2 counting value, so as to calculate the corresponding counting value equal to 2/0.2=10 when the difference between the accumulated phases of the reference clock $CLK_{REF}$ and the spread spectrum clock $CLK_{SS}$ reaches a setting value (assuming $1/2T_{REF}$). Therefore, when the finite state machine 530 determines that the oscillator counting value CN1 is equal to 10 or a multiple of 10 during the spectrum-spreading duration, it utilizes a control signal SC for controlling the counter 540 to switch from the state of counting up/counting down to the state of counting down/counting up. The count signal CNT provided by the counter 540 is then outputted to the multiplexer 430 shown in FIG. 4 to make it sequentially output the output clocks CK1, CK2, . . . , and CKn/CKn, CKn−1, . . . , CK2, and CK1 as the spread spectrum clock $CLK_{SS}$.

Figure 6:
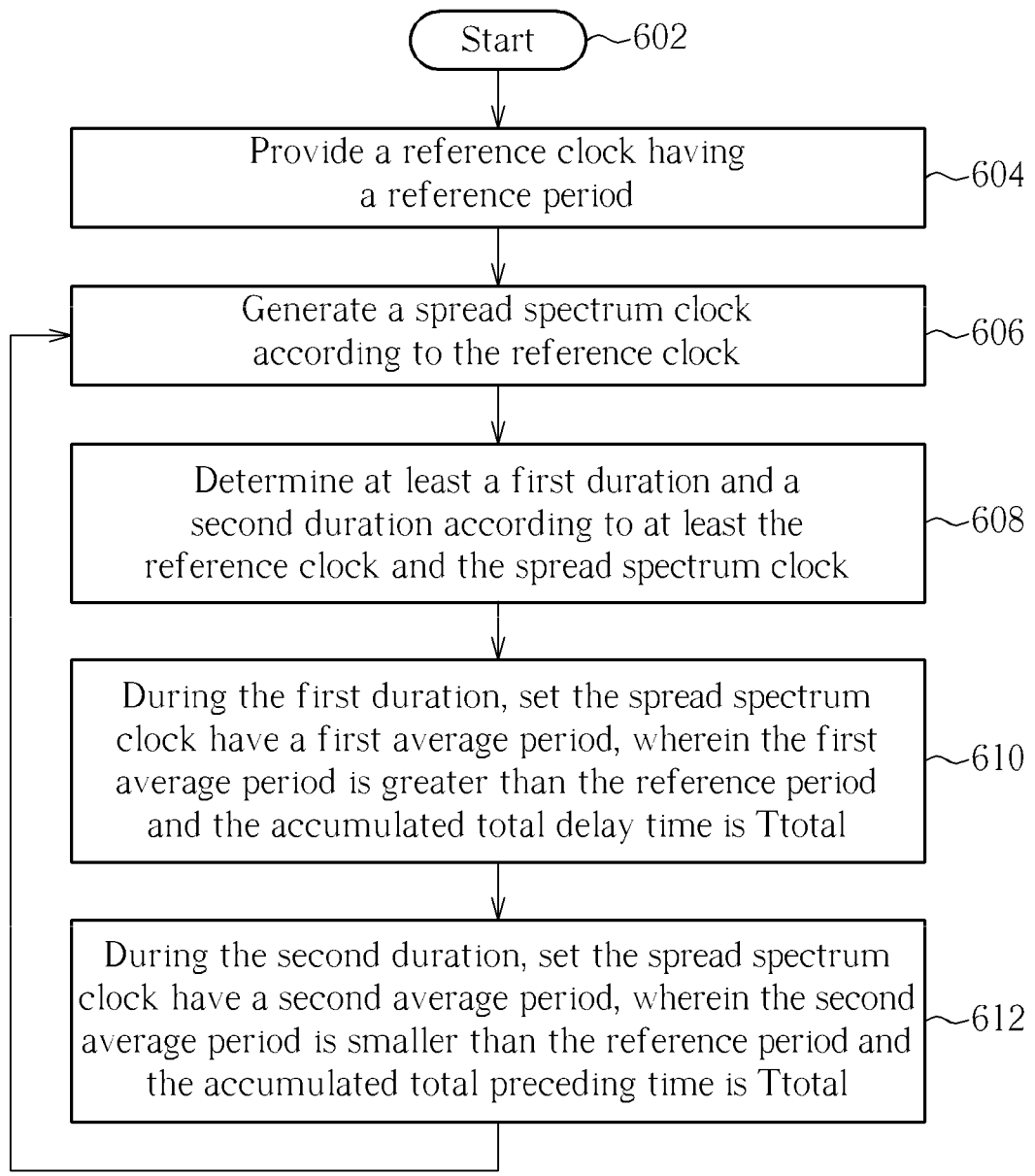
FIG. 6 is a flowchart illustrating a method for generating a spread spectrum clock according to an exemplary embodiment of the present invention.

FIG. 6 is a flowchart illustrating a method for generating a spread spectrum clock according to an exemplary embodiment of the present invention, which includes the following steps:

Step 602: Start.

Step 604: Provide a reference clock having a reference period.

Step 606: Generate a spread spectrum clock according to the reference clock.

Step 608: Determine at least a first duration and a second duration according to at least the reference clock and the spread spectrum clock.

Step 610: During the first duration, set the spread spectrum clock have a first average period, wherein the first average period is greater than the reference period and the accumulated total delay time (i.e., the sum of the differences between each first average period and each reference period) is Ttotal, and the total delay time can be represented by the total delay phase.

Step 612: During the second duration, set the spread spectrum clock have a second average period, wherein the second average period is smaller than the reference period and the accumulated total preceding time (i.e., the sum of the differences between each second average period and each reference period) is Ttotal, and the total preceding time can be represented by the total preceding phase. Go to Step 606.

How each element operates can be known by collocating the steps shown in FIG. 6 and the elements shown in FIG. 1 and FIG. 3 or FIG. 5 and FIG. 4. The Step 608 is executed by the judging and control unit 130, and the steps 610~612 are executed by the period setting unit 140. Operations of each element have been described above, and further description is therefore omitted here for brevity.

Figure 7:
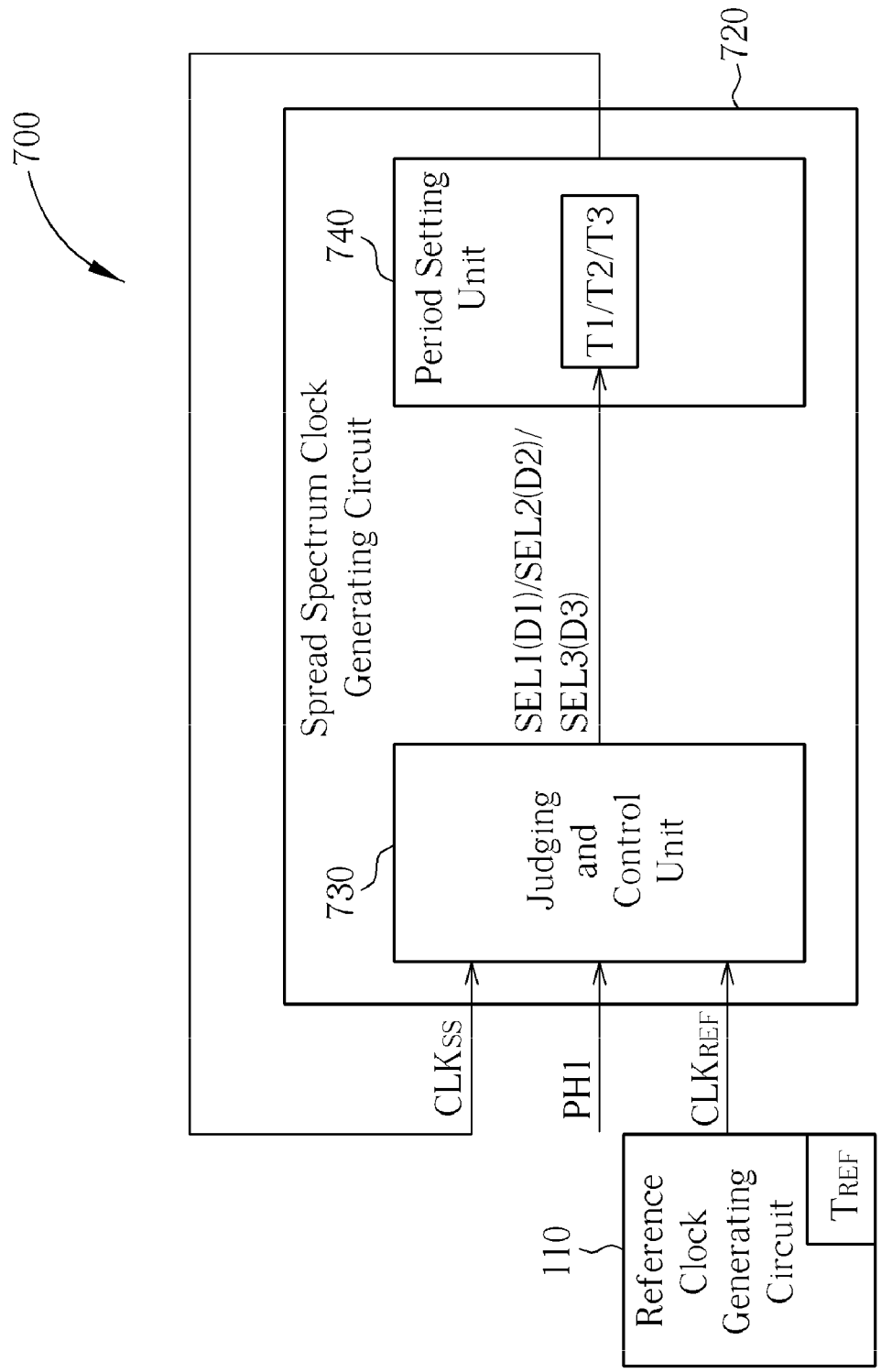
FIG. 7 is a diagram of a spread spectrum clock generating apparatus according to a second embodiment of the present invention.

FIG. 7 is a diagram of a spread spectrum clock generating apparatus 700 according to a second embodiment of the present invention. The architecture of the spread spectrum clock generating apparatus 700 in FIG. 7 is similar to the apparatus 100 in FIG. 1, and the difference between them is described in the following. In FIG. 7, the judging and control unit 730 (such as a finite state machine) generates the selecting signals SEL1, SEL2, and SEL3 according to the reference clock $CLK_{REF}$, the spread spectrum clock $CLK_{SS}$, and a phase holding signal PH1, so as to decide to switch to the duration D1, D2 or D3. The phase holding signal PH1 is a count signal for indicating whether a predetermined time is reached. In this embodiment, during the duration D1, if the spread spectrum clock $CLK_{SS}$ falls behind the reference clock $CLK_{REF}$ for $T_{REF}/2$, the judging and control unit 730 switches the state from the duration D1 to the duration D3. If the phase holding signal PH1 indicates that the time for switching from D1 to D3 reaches the predetermined time, the judging and control unit 730 switches the state from the duration D3 to the duration D2. When the spread spectrum clock $CLK_{SS}$ leads the reference clock $CLK_{REF}$ for $T_{REF}/2$, the judging and control unit 730 switches the state from the duration D2 to the duration D3. If the phase holding signal PH1 indicates that the time for switching from D2 to D3 reaches the predetermined time, the judging and control unit 730 switches the state from the duration D3 to the duration D1. The rest may be deduced by analogy. During the duration D3, the spread spectrum clock $CLK_{SS}$ outputted by the period setting unit 740 has a third average period T3. In this embodiment, the third average period T3 equals the reference period $T_{REF}$.

Figure 8:
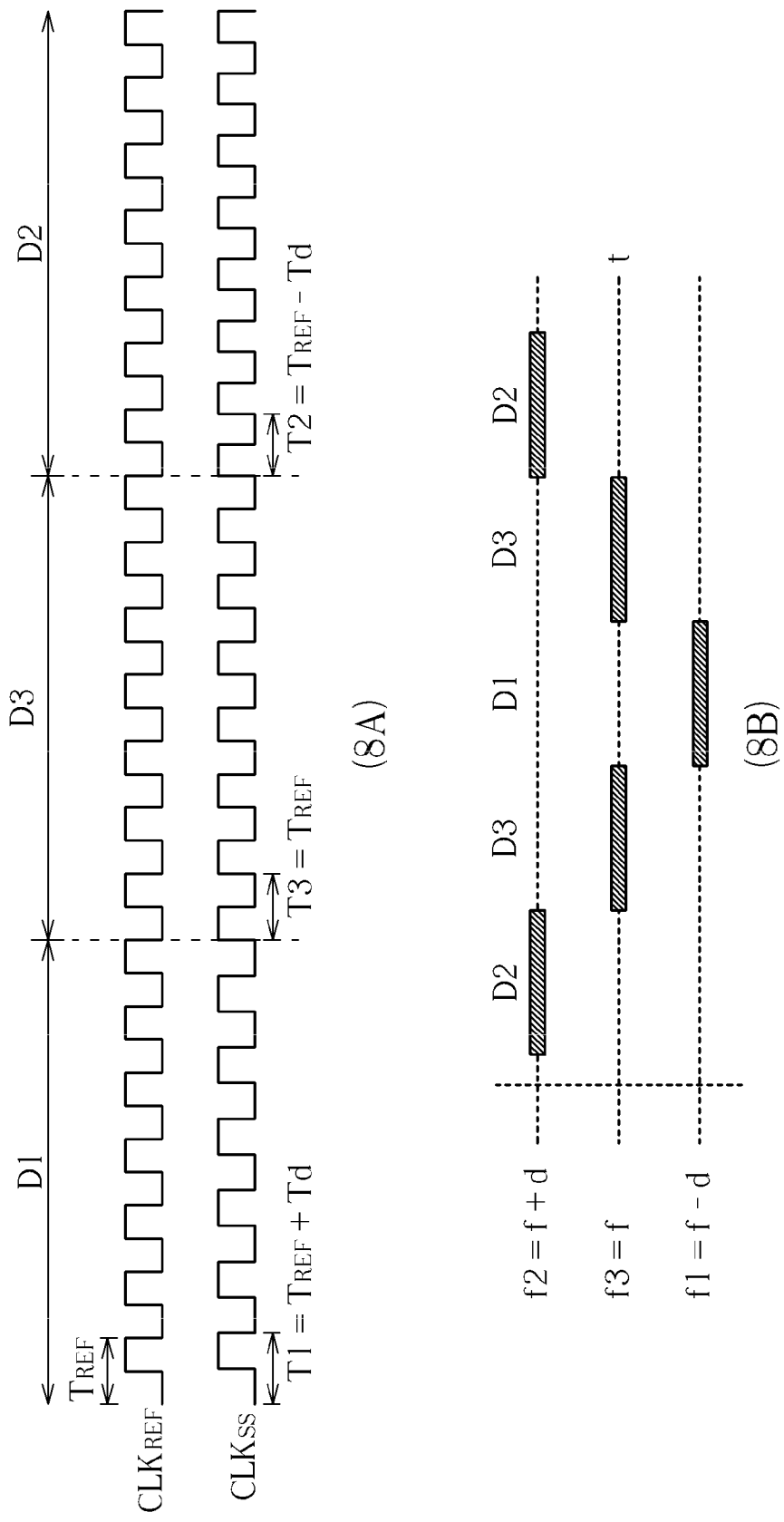
FIG. 8 (including 8A and 8B) is a diagram showing the spread spectrum clock in FIG. 7.

FIG. 8 (including 8A and 8B) is a diagram showing the spread spectrum clock $CLK_{SS}$ in FIG. 7, wherein 8A is viewed from a perspective of period and 8B is viewed from a perspective of frequency. As shown in 8A, the periods of the spread spectrum clock $CLK_{SS}$ during the durations D1, D3, and D2 are respectively $T1=T_{REF}+T_d$, $T3=T_{REF}$, and $T2=T_{REF}-T_d$. As shown in 8B, assume that the frequency of the spread spectrum clock $CLK_{SS}$ is represented by f. During the durations D1, D3, and D2, the frequencies of the spread spectrum clock $CLK_{SS}$ respectively fall in the frequencies f1 (i.e., f−d), f3 (i.e., f), and f2 (i.e., f+d). Be compared with the embodiment shown in FIG. 2, the frequency of the spread spectrum clock $CLK_{SS}$ can be further dispersed in this embodiment to achieve the goal of dispersing energy and reducing electromagnetic interference. Moreover, in this embodiment, the total delay time (or phase) accumulated during the duration D1 is equal to the total preceding time (or phase) accumulated during the duration D2, which can avoid the data throughput inconsistent before and after spreading spectrum.

Please note that, although the abovementioned embodiments are respectively illustrating the situations of two durations and three durations, those skilled in the art can utilize more than three durations to implement the present invention according to the disclosure of the specification.

Figure 9:
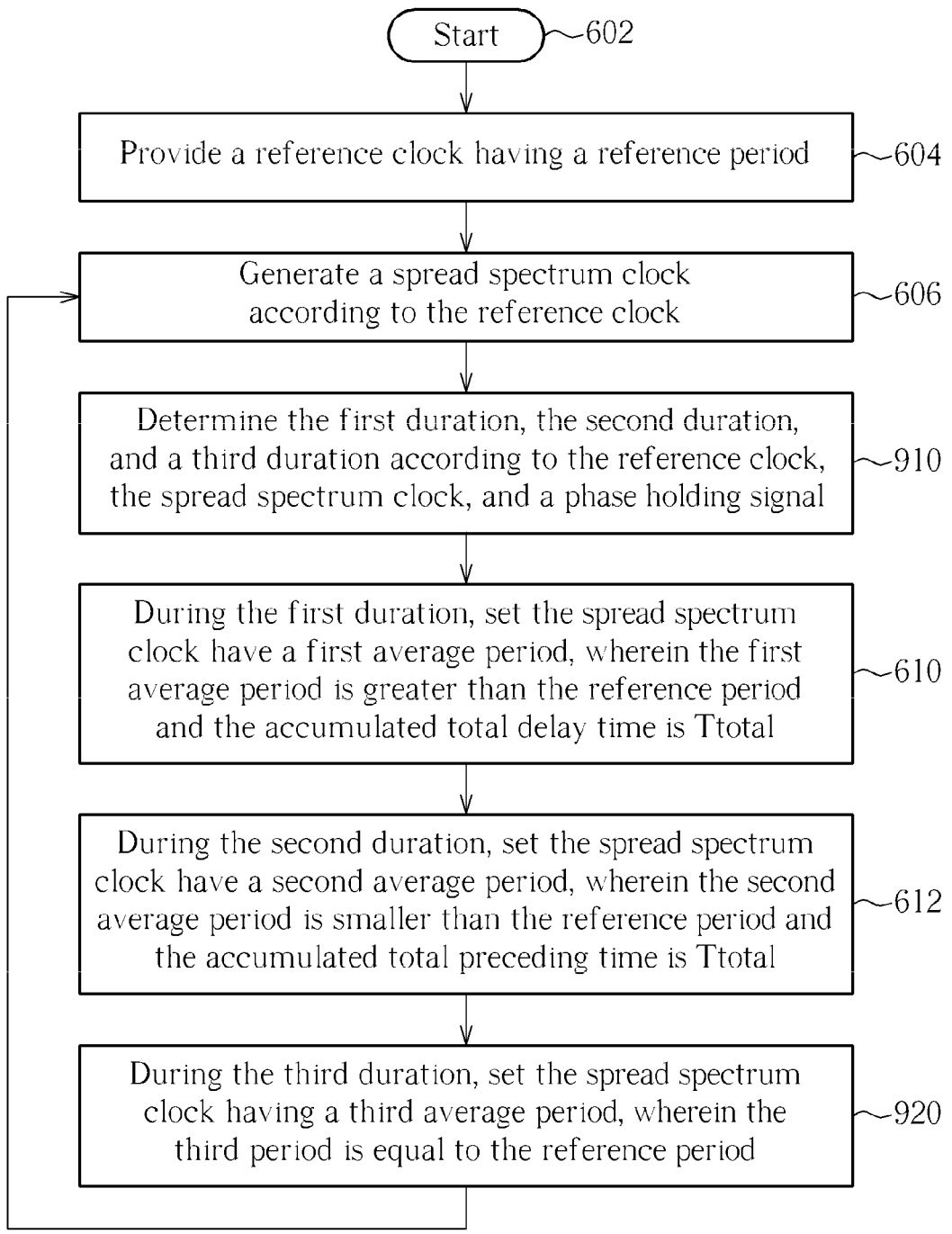
FIG. 9 is a flowchart illustrating a method for generating a spread spectrum clock according to another exemplary embodiment of the present invention.

Please refer to FIG. 9. FIG. 9 is a flowchart illustrating a method for generating a spread spectrum clock according to another exemplary embodiment of the present invention, which has the difference between the flowchart shown in FIG. 6 listed in the following:

Step 910: Determine the first duration, the second duration, and the third duration according to the reference clock, the spread spectrum clock, and a phase holding signal, wherein the phase holding signal is used for determining whether to switch to the third duration.

Step 920: During the third duration, set the spread spectrum clock having a third average period, wherein the third average period is equal to the reference period. Go to Step 606.

The abovementioned steps 910 and 920 can be executed by using the judging and control unit 730 and the period setting unit 740. The detailed operations of such element have been described above, and further description is therefore omitted here for brevity Furthermore, the steps of the abovementioned flowcharts shown in FIG. 6 and FIG. 9 are merely practicable embodiments of the present invention, and in no way should be considered to be limitations of the scope of the present invention. These methods can include other intermediate steps or can merge several steps into a single step without departing from the spirit of the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for generating a spread spectrum clock, comprising:
providing a reference clock having a reference period; and
generating the spread spectrum clock according to the reference clock, comprising the steps of:
generating a plurality of output clocks respectively having different phases according to the reference clock;
generating a first control signal according to the reference clock and the spread spectrum clock, and starting a first duration accordingly;
during the first duration, outputting a first selecting signal representing a first predetermined sequence according to the first control signal;
during the first duration, sequentially outputting some or all of the output clocks as the spread spectrum clock according to the first predetermined sequence of the first selecting signal;
generating a second control signal according to the reference clock and the spread spectrum clock, and starting a second duration accordingly;
during the second duration, outputting a second selecting signal representing a second predetermined sequence according to the second control signal, wherein the second predetermined sequence is a substantial reversed sequence of the first predetermined sequence; and
during the second duration, sequentially outputting some or all of the output clocks as the spread spectrum clock according to the second predetermined sequence of the second selecting signal.

2. The method of claim 1, wherein an accumulated delay phase contributed by the output clocks outputted during the first duration is substantially equal to an accumulated preceding phase contributed by the output clocks outputted during the second duration.

3. The method of claim 1, wherein the step of generating the first control signal and/or the second control signal comprises:
determining whether a first edge of the reference clock meets with a second edge of the spread spectrum clock to generate a judging result, wherein the first edge and the second edge are respectively a positive edge and a negative edge or respectively a negative edge and a positive edge; and
when the judging result indicates that the first edge meets with the second edge, generating the second/first control signal during the first/second duration and starting the second/first duration accordingly.

4. The method of claim 3, wherein the duty cycle of the reference clock is substantially equal to 50%.

5. The method of claim 1, further comprising:
generating a third control signal according to the reference clock and the spread spectrum clock, and starting a third duration accordingly;
during the third duration, outputting a third selecting signal according to the third control signal; and
during the third duration, outputting at least one of the reference clock and the output clocks as the spread spectrum clock according to the third selecting signal.

6. The method of claim 5, further comprising:
during the third duration, generating the first control signal or the second control signal according to a count signal of a predetermined period, and starting the first duration or the second duration accordingly.

7. A method for generating a spread spectrum clock, comprising:
providing a reference clock having a reference period; and
generating the spread spectrum clock according to the reference clock, comprising the steps of:
generating a plurality of output clocks respectively having different phases according to the reference clock;
generating a first control signal according to a count signal, and starting a first duration accordingly;
during the first duration, outputting a first selecting signal representing a first predetermined sequence according to the first control signal;
during the first duration, sequentially outputting some or all of the output clocks as the spread spectrum clock according to the first predetermined sequence of the first selecting signal;
generating a second control signal according to the count signal, and starting a second duration accordingly;
during the second duration, outputting a second selecting signal representing a second predetermined sequence according to the second control signal, wherein the second predetermined sequence is a substantial reversed sequence of the first predetermined sequence; and
during the second duration, sequentially outputting some or all of the output clocks as the spread spectrum clock according to the second predetermined sequence of the second selecting signal.

8. The method of claim 7, wherein an accumulated delay phase contributed by the output clocks outputted during the first duration is substantially equal to an accumulated preceding phase contributed by the output clocks outputted during the second duration.

9. The method of claim 7, further comprising:
generating a third control signal according to the count signal, and starting a third duration accordingly;

during the third duration, outputting a third selecting signal according to the third control signal; and during the third duration, outputting at least one of the reference clock and the output clocks as the spread spectrum clock according to the third selecting signal.

10. A spread spectrum clock generating apparatus, comprising:

a reference clock generating circuit, for providing a reference clock having a reference period; and a spread spectrum clock generating circuit, coupled to the reference clock generating circuit, for generating a spread spectrum clock according to the reference clock, the spread spectrum clock generating circuit comprising:

a judging and control unit, comprising:

a control signal generator, for generating a first control signal according to the reference clock and the spread spectrum clock and starting a first duration accordingly, and for generating a second control signal according to the reference clock and the spread spectrum clock and starting a second duration accordingly; and a selecting signal generator, for outputting a first selecting signal representing a first predetermined sequence according to the first control signal during the first duration, and for outputting a second selecting signal representing a second predetermined sequence according to the second control signal during the second duration, wherein the second predetermined sequence is a substantial reversed sequence of the first predetermined sequence;

a period setting unit, comprising:

a multi-phase clock generator, for generating a plurality of output clocks respectively having different phases according to the reference clock; and a selector, for sequentially outputting some or all of the output clocks as the spread spectrum clock according to the first predetermined sequence of the first selecting signal during the first duration, and for sequentially outputting some or all of the output clocks as the spread spectrum clock according to the second predetermined sequence of the second selecting signal during the second duration.

11. The apparatus of claim 10, wherein an accumulated delay phase contributed by the output clocks outputted by the selector during the first duration is substantially equal to an accumulated preceding phase contributed by the output clocks outputted by the selector during the second duration.

12. The apparatus of claim 10, wherein the judging and control unit further comprising:

a judging circuit, for determining whether a first edge of the reference clock meets with a second edge of the spread spectrum clock to generate a judging result, wherein the first edge and the second edge are respectively a positive edge and a negative edge or respectively a negative edge and a positive edge;

wherein when the judging result of the judging circuit indicates that the first edge meets with the second edge, the control signal generator generates the second/first control signal during the first/second duration and starts the second/first duration accordingly.

13. The apparatus of claim 12, wherein the duty cycle of the reference clock is substantially equal to 50%.

14. The apparatus of claim 10, wherein the control signal generator is further used for generating a third control signal according to the reference clock and the spread spectrum clock, and starting a third duration accordingly; the selecting signal generator is further used for outputting a third selecting signal according to the third control signal during the third duration; and the selector is further used for outputting at least one of the reference clock and the output clocks as the spread spectrum clock according to the third selecting signal during the third duration.

15. The apparatus of claim 14, wherein the control signal generator is further used for generating the first control signal or the second control signal according to a count signal of a predetermined period during the third duration, and starting the first duration or the second duration accordingly.

16. A spread spectrum clock generating apparatus, comprising:

a reference clock generating circuit, for providing a reference clock having a reference period; and a spread spectrum clock generating circuit, coupled to the reference clock generating circuit, for generating a spread spectrum clock according to the reference clock, the spread spectrum clock generating circuit comprising:

a judging and control unit, comprising:

a control signal generator, for generating a first control signal according to a count signal and starting a first duration accordingly, and for generating a second control signal according to the count signal and starting a second duration accordingly; and a selecting signal generator, for outputting a first selecting signal representing a first predetermined sequence according to the first control signal during the first duration, and for outputting a second selecting signal representing a second predetermined sequence according to the second control signal during the second duration, wherein the second predetermined sequence is a substantial reversed sequence of the first predetermined sequence;

a period setting unit, comprising:

a multi-phase clock generator, for generating a plurality of output clocks respectively having different phases according to the reference clock; and a selector, for sequentially outputting some or all of the output clocks as the spread spectrum clock according to the first predetermined sequence of the first selecting signal during the first duration, and for sequentially outputting some or all of the output clocks as the spread spectrum clock according to the second predetermined sequence of the second selecting signal during the second duration.

17. The apparatus of claim 16, wherein an accumulated delay phase contributed by the output clocks outputted by the selector during the first duration is substantially equal to an accumulated preceding phase contributed by the output clocks outputted by the selector during the second duration.

18. The apparatus of claim 16, wherein the control signal generator is further used for generating a third control signal according to the count signal, and starting a third duration accordingly; the selecting signal generator is further used for outputting a third selecting signal according to the third control signal during the third duration; and the selector is further used for outputting at least one of the reference clock and the output clocks as the spread spectrum clock according to the third selecting signal during the third duration.

* * * * *